Dec. 15, 1931.  J. W. OW  1,836,985
SELECTIVE BRAKING FOR CIRCUIT INTERRUPTERS
Filed Feb. 6, 1929
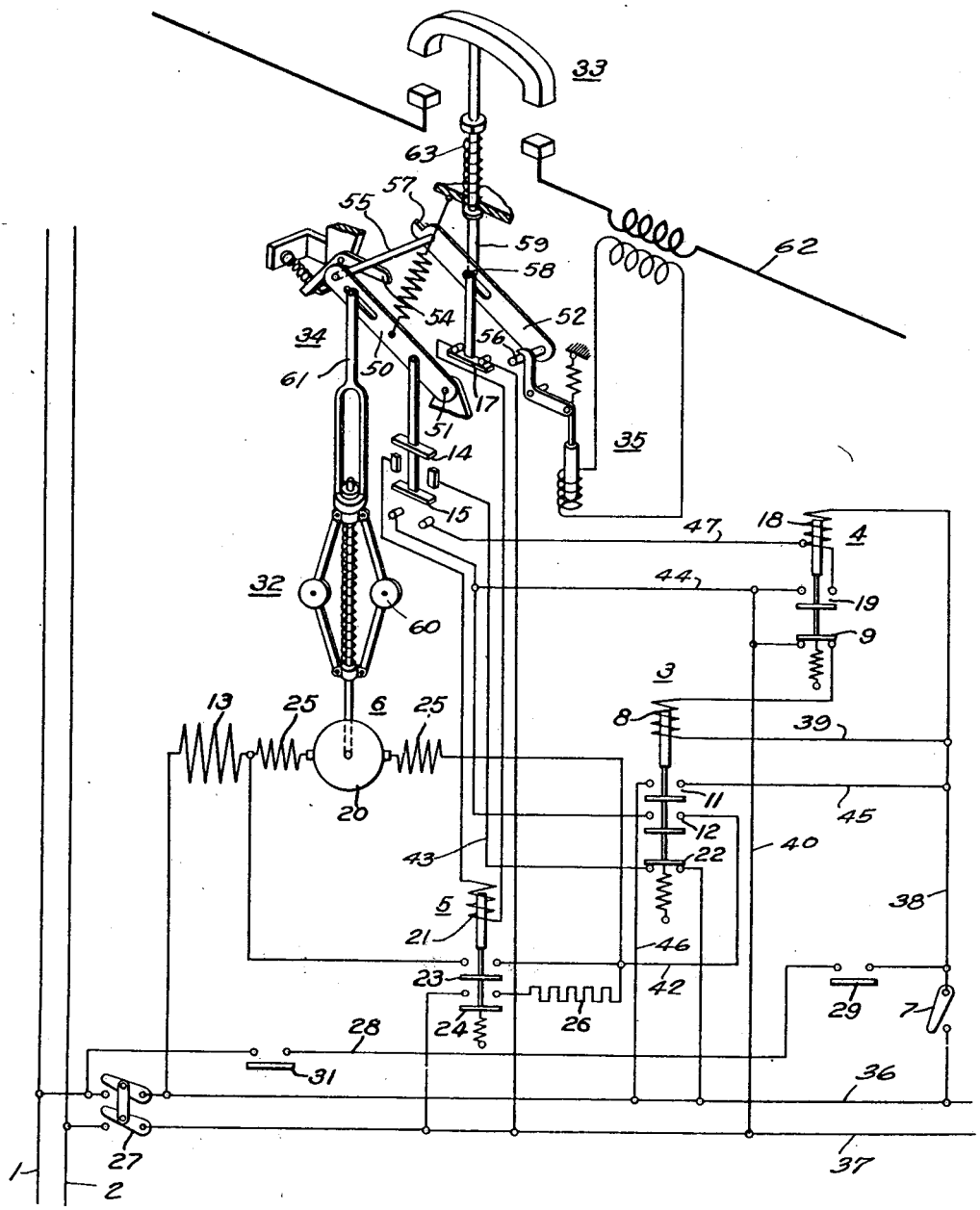
INVENTOR
Joseph W. Ow.
BY
ATTORNEY Patented Dec. 15, 1931

1,836,985

UNITED STATES PATENT OFFICE

JOSEPH W. OW, OF WILKINSBURG, PENNSYLVANIA, ASSIGNOR TO WESTINGHOUSE ELECTRIC & MANUFACTURING COMPANY, A CORPORATION OF PENNSYLVANIA

SELECTIVE BRAKING FOR CIRCUIT INTERRUPTERS

Application filed February 6, 1929. Serial No. 337,933.

My invention relates to circuit interrupters and more particularly to a control circuit for a centrifugal operating mechanism therefor.

One object of my invention is to provide a control circuit for a centrifugal operating mechanism that shall apply a braking force to the motor thereof for reducing the time of rotation of the motor after its deenergization.

Centrifugal operating mechanism for circuit interrupters are usually supplied with low friction bearings to increase the efficiency of the mechanism, thereby permitting the mechanism to rotate for some considerable time after the motor has been deenergized. Under normal operating conditions, when the circuit interrupter remains in latched position and also under ordinary application, this continued rotation, while it delays the resetting of the mechanism, has no detrimental effect. However, under certain conditions, it is desirable and imperative that the mechanism retrieve almost instantly so that the circuit interrupter can again be actuated to closed position, if tripped prematurely.

It is therefore another object of my invention to provide control apparatus for the above-described structure that shall be actuated to apply a braking force to the motor thereof throughout its entire period of rotation after being deenergized.

A further object of my invention is to provide an auxiliary switch on each side of the trip-free structure of the centrifugal mechanism, that shall be so connected in the braking circuit of the motor, that the braking force will only be applied when the circuit interrupter and the centrifugal mechanism are in predetermined relation.

With these principles and objects in mind, my invention will best be understood by referring to the following description and drawing, wherein:

The figure shows a schematic arrangement of the relays and auxiliary switches associated with the motor of my centrifugal mechanism in such a manner as to embody my invention.

My invention comprises, in general, a control circuit 1, 2, relays 3, 4 and 5, a motor 6 and a control switch 7, the relation and operation of which will now be described in detail.

The control switch 7, when moved to closed position with the main switch 27 closed, completes a circuit from line 1 through conductors 36, 38, and 39 to an actuating coil 8 of the relay 3 and contacts 9 of the relay 4, the latter being in closed position when the said relay is deenergized, and through conductors 40 and 37 to the line 2. The relay 3 is thereby actuated to closed position, closing contacts 11 and 12 thereof. The contacts 12 complete a circuit through the motor 6, from conductor 36 through the field winding 13, the armature 20 and the windings 25, conductors 41 and 42, through contacts 12 and conductors 43, 44 and 40 to conductor 37. The circuit is thereafter made independent of the position of the control switch 7 by the completion of a circuit parallel therewith by the contacts 11 through conductors 45 and 38, and conductors 46 and 36. The motor is thus energized to actuate the centrifugal device 32 which applies a force to the circuit interrupter 33, moving it to closed position. The circuit interrupter is actuated to open position when the release mechanism and circuit 35 are energized.

The centrifugal mechanism 32 is provided with a trip-free structure 34 that permits the circuit interrupter 33 to be released from the centrifugal device 32 and to move to open position independently thereof.

The trip-free structure 34 is of conventional type having a lever 50, which is actuated by the centrifugal mechanism 32, and which is pivoted at one end about a fixed point 51. The other end of lever 50 has pivoted thereto, by means of pin 55, a second lever 52 which is provided with a projection 56 at one end to be engaged by latch 53 and with a notch 57 at the other end to be engaged by latch 54. The operating rod 59 of the circuit interrupter 33 is connected to the lever 52 at a point 58 near the center thereof.

The circuit interrupter 33 is shown in the drawing in its normal open position. When the motor 6 is energized, the weights 60 of the centrifugal mechanism 32 are thrown outward which pulls downward on the rod 61 and levers 50 and 52 until latch 54 engages the notch 57 of lever 52 holding the circuit interrupter 33 in closed position. If an overload occurs in the main circuit 62, the solenoid circuit 35 is energized to release latch 53 which allows the lever 52 to swing about its pivoted connection 55 with lever 50 and open the circuit due to the action of the compression spring 63 on the operating rod 59. When lever 52 pivots about pin 55, the notch 57 in the end of lever 52 is disengaged from latch 54 allowing lever 50 and the end of lever 52 to be moved upward as soon as the weights of the centrifugal mechanism are retracted, if not already in that position. The upward movement of lever 50 causes lever 52 to pivot about its connection 58 with the operating rod 59 until latch 53 engages the projection 56 on the end of lever 52 and the mechanism is in the normal open position shown on the drawing ready to be reclosed by the motor 6.

An auxiliary switch having contacts 14 and 15 is connected to the lever 50 on the side of the trip-free structure 34 adjacent the centrifugal device 32, the contacts 15 being in closed position when the weights 60 of the centrifugal mechanism are in the extended position which it occupies when the circuit-interrupter 33 is fully closed, while the contacts 14 are in closed position in all except the fully retracted position of the centrifugal mechanism 32 which the latter occupies when the circuit interrupter 33 is fully opened, so that contacts 14 will remain closed until the normal open position is fully reached.

A second auxiliary switch having contact 17 associated therewith is connected to the lever 52 on that side of the trip-free structure which is adjacent the circuit-interrupter 33 and this auxiliary switch is in a closed position when the circuit interrupter is in open circuit position, the latter being that shown in the figure.

As the circuit interrupter 33 reaches closed position, the contacts 15 are closed, completing a circuit from line 37 through conductors 40, 44, and 47 to the coil 18 of the relay 4, and through conductor 38 and switch 7, or conductor 45, contacts 11 and conductor 46, to line 36, thereby actuating the relay to closed position. The actuation of the relay 4 opens the contacts 9, thereby deenergizing the relay 3 and at the same time moving contacts 19 to closed position to complete a circuit to the coil 18 through conductor 40 independent of the contacts 15 through conductors 44 and 47. The deenergization of the relay 3 opens the contacts 12, which cuts off energy from the motor 6 and also opens contacts 11 which interrupt the circuit to the coil 18 of relay 4. The latter is thereby deenergized provided the control switch 7 is in open position.

In the normal closed position of the circuit interrupter 33, the relay positions will also be that known in the diagram, with the exception that the contacts 14 and 15 will be in closed position and contacts 17 will be opened. If the control switch 7 is again energized while the circuit interrupter 33 is in normal closed position, the relay 4 will be immediately reenergized through conductors 38 and 47, contacts 15 which are closed, and conductors 44 and 40, cutting out the relay 3 due to opening of contacts 9 and thereby preventing the circuit to the motor 6 from being re-energized, while the circuit interrupter is in the closed position.

After the circuit to the motor 6 has been deenergized and the circuit interrupter 33 latched in closed position, the centrifugal device 32 and the armature 20 of the motor will continue to rotate for a period of substantially thirty to forty-five seconds, depending upon the inertia of the mechanism 32 and the friction of the associated parts.

Under normal conditions, when the circuit interrupter 33 remains closed, this continued rotation is in no way detrimental. This is also true in ordinary applications when a second closure is not necessary before the centrifugal mechanism has had time to expend its energy and move to retrieved position. There are, however, certain applications that require a closure of the circuit interrupter 33 before the centrifugal device 32 has normally retrieved from a previous closing operation.

To meet this condition, I have provided the separate relay 5 and means for employing it in conjunction with the relays 3 and 4 heretofore mentioned. The relay 5 controls auxiliary circuits to the motor 6 that provides an electrical braking force to the motor armature 20 which slows down its rotation and thereby reduces the time of retrieving of the centrifugal mechanism 32 to its normal open position shown in the drawing.

A coil 21 of the relay 5 is connected in a circuit containing the contacts 14, 17 and 22. When all of these contacts are in closed position, the circuit will be completed thereby to the coil 21 and the relay 5 will be actuated. This actuation of the relay 5 can only take place when the circuit interrupter has moved to open position, thereby closing the contact 17 during the time that the centrifugal mechanism 32 is in extended position, which thereby closes the contacts 14. This sequence is also effected by the contacts 22 of the relay 3 that are closed only when the said relay is deenergized and contacts 12 thereof are in open position.

Under such conditions, the relay 5 is actuated to close the contacts 23 and 24 thereof, the contacts 23 applying a short-circuit across the armature 20 and the windings 25 of the motor 6, the contacts 24 inserting a resistor 26 in series with the motor field 13, thereby procuring its re-energization. The continued rotation of the short circuited armature 20 in the field of the motor produces a braking force to the armature that quickly reduces its rotation and brings it to rest in a short period of time. It is to be understood that other circuits for obtaining electrical braking may be employed to meet the requirements of various motor types and operating conditions.

In order to reduce the time of rotation from forty-five seconds to approximately six seconds, it was found that the resistor employed should be such that the braking current supplied to the main field 13 need only be approximately one-fourth of the normal closing current. By varying the amount of resistance, different braking times may be obtained to suit the service conditions.

Under normal operating conditions, however, as pointed out above, the braking of the motor would not take place as it is necessary that the centrifugal mechanism 32 and the circuit interrupter 33 be in a predetermined relation with each other so that the contacts 14 and 17 will be in closed position. This relation is that in which the circuit interrupter 33 is open while the centrifugal mechanism 32 is in extended unretrieved position.

A switch 27 is shown in the diagram, employed to deenergize the entire system when the circuit interrupter is to remain inoperative. A second closing circuit 28 is shown in parallel relation with the circuit of the control switch 7, having contacts 29 that may be remotely closed through the actuation of the contacts 31, or a multiplicity of such contacts suitably controlled, thereby enabling the circuit interrupter to be synchronized with other apparatus, or to automatically carry out a predetermined series of operations.

It will thus be seen that I have provided an electrical braking means for the motor that is effective throughout substantially the entire period of rotation of the armature and centrifugal device after the motor has been deenergized. My control circuit is further novel in providing a selective electrical braking means for the motor of the centrifugal mechanism that is only effective to reduce the time of rotation of the mechanism when the circuit interrupter and the centrifugal mechanism bear a predetermined relation with each other.

While I have described and illustrated a single embodiment of my invention, it will be evident to anyone skilled in the art that many changes, additions, subtractions and modifications thereof may be made without departing from the spirit and scope of my invention. I, therefore, do not wish the appended claims to be limited except to the degree imposed by the prior art.

I claim as my invention:

1. In a motor-operated actuating device for a circuit interrupter, means for energizing and deenergizing said motor and means for applying a braking force after deenergization of said motor.

2. The combination with a circuit interrupter, of a centrifugal device for actuating it to closed position, a motor for rotating the centrifugal device, means for deenergizing the motor after the circuit interrupter has been actuated, and means for thereafter reducing the time of rotation of the centrifugal device.

3. The combination with a control circuit for the motor, of a centrifugal device employed to actuate a circuit interrupter to closed circuit position, of means for deenergizing the motor after the circuit interrupter has been actuated and a second means actuated by the first said means to apply a counter electromotive force to the motor to reduce the time of rotation of the centrifugal device after the motor has been deenergized.

4. A control circuit for the motor, of a centrifugal operating mechanism associated with a circuit interrupter, a relay for completing a circuit to the motor, a second relay for deenergizing the first said relay and a third relay associated with the first said relays for causing a braking force to be applied to the said motor after it is deenergized.

5. A centrifugal mechanism for a circuit interrupter, a motor therefor having a field and an armature, a circuit for energizing the motor, means for breaking the circuit to the said motor, a second means energized by the first said means for short-circuiting said armature and for inserting a resistor in series with the said field.

6. A centrifugal mechanism for a circuit interrupter, a motor therefor having a field and an armature, a circuit for energizing the motor, means for breaking the circuit to the said motor, a resistor, a circuit for short-circuiting the armature and a second means energized by the first said means when actuated to deenergize the motor and adapted to complete said short circuit across the motor armature and to insert the said resistor in series with the motor field.

7. The combination with a circuit interrupter, of a motor-operated centrifugal operating mechanism therefore, a trip-free mechanism between the centrifugal mechanism and the circuit interrupter, a control switch on the side of the trip-free mechanism adjacent the circuit interrupter, a second control switch on the side of the trip free device adjacent the centrifugal mechanism, an electrical braking circuit for the motor and a relay for completing the said electrical braking circuit when the said control switches are in predetermined relative position.

8. The combination with a circuit interrupter of a motor-operated centrifugal operating mechanism therefor, a trip-free mechanism between the centrifugal device and the circuit interrupter, a control switch on the side of the trip-free device adjacent the circuit interrupter, a second control switch on the side of the trip-free device adjacent the centrifugal mechanism, an electrical braking circuit for the motor and a relay for completing the said electrical braking circuit when the circuit interrupter and the centrifugal device are in predetermined relative positions.

9. The combination with a circuit interrupter and a centrifugal-operating mechanism having trip-free means associated therewith, of a motor for actuating the mechanism, and means for applying a braking force to the motor only when the circuit interrupter and the centrifugal mechanism are in a predetermined abnormal relation.

10. The combination with a circuit interrupter and a centrifugal-operating mechanism therefor, of a motor for actuating the mechanism, a trip-free device between the motor and the circuit interrupter and means for applying a braking force throughout substantially the entire retrieving movement of the centrifugal mechanism when the circuit interrupter and the centrifugal mechanism are in a predetermined relation.

11. The combination with a circuit interrupter, of a centrifugal operating mechanism adapted to procure the closure thereof, a motor for actuating the mechanism and means for applying an electrical braking force to the motor.

12. The combination with a circuit interrupter, of a centrifugal operating mechanism adapted to procure the closure thereof, a motor for actuating the mechanism and means for applying a selective electrical braking force to the motor.

13. The combination with a circuit interrupter, of a centrifugal operating mechanism adapted to procure the closure thereof, a motor for actuating the mechanism and means for applying an electrical braking force to the motor under predetermined conditions.

In testimony whereof, I have hereunto subscribed my name this 31st day of January, 1929.

JOSEPH W. OW.